United States Patent
Podlaski et al.

(10) Patent No.: US 10,674,730 B2
(45) Date of Patent: Jun. 9, 2020

(54) METHOD FOR STIMULATION OF SEEDS

(71) Applicant: NANO-TECH POLSKA SP.Z O.O. SP. K., Warsaw (PL)

(72) Inventors: Slawomir Podlaski, Warsaw (PL); Andrzej Tul, Warsaw (PL); Krystyna Oracz, Warsaw (PL); Chrystian Chomontowski, Warsaw (PL); Jaroslaw Malek, Warsaw (PL); Pawel Siejko, Warsaw (PL)

(73) Assignee: NANO-TECH POLSKA SP. Z O.O. SP. K., Warsaw (PL)

( * ) Notice: Subject to any disclaimer, the term of this patent is extended or adjusted under 35 U.S.C. 154(b) by 0 days.

(21) Appl. No.: 15/794,534

(22) Filed: Oct. 26, 2017

(65) Prior Publication Data

US 2018/0042239 A1     Feb. 15, 2018

Related U.S. Application Data

(63) Continuation of application No. PCT/PL2016/000064, filed on May 25, 2016.

(30) Foreign Application Priority Data

May 25, 2015   (PL) .......................... 412471

(51) Int. Cl.
| | | |
|---|---|---|
| *A01N 59/16* | (2006.01) | |
| *A01C 1/06* | (2006.01) | |
| *A01N 59/20* | (2006.01) | |
| *A01C 1/02* | (2006.01) | |
| *A01N 25/04* | (2006.01) | |

(52) U.S. Cl.
CPC ................ *A01N 59/16* (2013.01); *A01C 1/02* (2013.01); *A01C 1/06* (2013.01); *A01N 25/04* (2013.01); *A01N 59/20* (2013.01)

(58) Field of Classification Search
None
See application file for complete search history.

(56) References Cited

PUBLICATIONS

Sethy et al.,(Journal of Nature, Science, Biology and Medicine (2013), vol. 4, No. 2, pp. 272-275), online, pp. 1-6 of 6 (Year: 2013).*
PUBMED online, PMID 24520739 (J Environ Sci (China) (2013), vol. 25 No. 9, pp. 1947-1955), Abstract. (Year: 2013).*
Mirriam-Webster Dictionary—pepper [online] [retrieved on Jul. 17, 2019], retrieved from the internet: <URL:https://www.merriam-webster.com/dictionary/pepper>. (Year: 2019).*

* cited by examiner

*Primary Examiner* — Hasan S Ahmed
*Assistant Examiner* — Frank Choi
(74) *Attorney, Agent, or Firm* — Myers Wolin, LLC

(57) ABSTRACT

Method for the stimulation of seeds of dicotyledonous plants, wherein the seeds are primed in a solution containing nonionic nanoparticles of a metal selected from: silver (Ag), gold (Au), copper (Cu) and platinum (Pt) at a concentration from 0.05 ppm to 50 ppm to obtain 40-60% by weight of water content, and then dried at room temperature to obtain 10-40% by weight of water content. The invention also relates to the use of a solution of nonionic nanoparticles of a metal selected from: silver, gold, copper and platinum to stimulate seeds of dicotyledonous plants.

3 Claims, No Drawings

METHOD FOR STIMULATION OF SEEDS

CROSS-REFERENCE TO RELATED APPLICATIONS

This is a continuation application of International Application No. PCT/PL2016/000064, filed May 25, 2016, which claims priority to Polish Application No. P.412471, filed May 25, 2015, the contents of each of which are incorporated herein by reference.

FIELD

The present invention relates to a new method for stimulation of seeds of agricultural dicotyledonous plants.

BACKGROUND

Advances in plant breeding methodology combined with increasing expenditures on breeding and increasing intensity of the improvement of seed quality imply that the price of seeds is constantly growing. Therefore, they are sold by the piece in the form of so-called seed units. This mainly concerns the seeds of sugar beet, canola and numerous species of vegetables.

Stimulation of seeds is a process of bringing the seeds to such a level of moisture that allows for the start of physicochemical processes in seeds, which lead to activation of embryo metabolism, but is not sufficient to break the layers surrounding the embryo by the elongating radicule. Stimulated seeds sown into the soil, having completed the pregermination stage, move faster to the phase of proper germination, as well as growth and development of a young plant (seedling) than seeds which were not prepared in this manner. This can significantly shorten the period of emergence, which is particularly important during spring frosts, drought or excessive soil moisture, as well as on easily encrusted soils. Even and uniform germination of seed generation in diverse environmental conditions achieved in this manner is also important. Many years of research confirmed that accelerated, even by one day, and uniform germination can have a significant impact on the increase in the quantity and quality of crops, and thus measurable economic gain.

The essence of all existing stimulation technologies is to provide control of the quantity of water and rate of its absorption by seeds, and subsequently to subject them to a process of slow drying at room temperature. In order to control water absorption in the stimulating process, priming of seeds with a strictly defined amount of water or use of osmotic solutions, such as polyethylene glycol or inorganic salts, are applied.

Based on the publication (Gimenez-Sampaio T., Sampaio N. V., Souza R. H. V. de. 1997. Increase in germination and rate and emergence under low temperatures of maize (Zea mays L.) seeds subjected to osmotic preconditioning, Revista Cientifica Rural 2/1: 20-27), it is known that stimulation of corn seeds in a PEG 6000 solution at a concentration of 100 or 150 g/L of water, or in a 0.3 and 0.1% $KNO_3$ solution for 10 days, improved their germination capacity under laboratory conditions by 35%. The germination capacity of seeds and their vigour also increased after priming in a solution of calcium salts at a concentration of 10 mmol/L.

Patent specification PL 207240 discloses a method for accelerating the germination of sugar beet seeds, wherein the seeds are mixed with natural zeolites or synthetic zeolites saturated with water, and after a defined period of imbibition in the presence of moist zeolites, the seeds are allowed to dry at room temperature and 60% of air humidity. Stimulation of sugar beet seeds to germination in the presence of zeolites is possible thanks to their sorption characteristics—they easily absorb water and easily liberate it in a continuous manner. An increase in the efficiency of this method was obtained by interrupting the stimulation process, drying the seeds and re-stimulation (i.e. stimulation—drying—stimulation and another drying) according to patent PL216893. According to this method, the seeds are mixed with zeolite, incubated at a temperature of 15-22° C. for 1-8 hours, depending on the vigour of stimulated seeds, then the process is interrupted, the seeds are separated from the zeolite and dried to a moisture of 7 to 30%, and subsequently, the seeds are mixed with zeolite again and stored at a temperature of 15-22° C. for 18-24 h. It is postulated that desiccation stress occurred as a result of drying the seeds causes the secretion of plant hormones activating a cascade of reactions leading to accelerated and uniform germination.

There are reports indicating that metal nanoparticles can be used to stimulate plant growth, although there is still no information related to their influence on seed germination itself. Thus, based on patent application RU2463757, it is known that it is possible to treat seeds of agricultural plants before sowing with a colloidal solution containing: silver (Ag) nanoparticles in the form of ions, dioctyl sodium sulfosuccinate, quercetin and ammonia. Before sowing, the seeds are sprayed with a solution of a concentration of 0.0047%, at an amount of 10 $dm^3$/mg of seeds. Once germination was completed, the seeds prepared in this manner produced plants characterised by a larger size. The description documented the effect of the product on species such as: corn, wheat, oat and barley. Stimulation of plant growth using a solution containing Ag nanoparticles is also disclosed in patent application WO2014062079, but in this case, they are connected with polyhexamethylene biguanide or polyhexamethylene guanidine, which are known for their antibacterial activity. In turn, the summary of patent application KR20020034794 presents a process for application of gold (Au), silver (Ag) an copper (Cu) ions on seeds, characterised in that seeds such as rice, beans and corn are dried to reduce their water content, and subsequently, they are placed in distilled water between electrodes selected from a silver, gold and copper electrode for 5 h to allow deposition of metal particles on the grains. According to the declaration contained in the summary of the description, seeds prepared in this manner are less vulnerable to damage caused by bacteria, due to the known biocidal characteristics of the applied metals.

The above-mentioned applications of nanoparticles and metal ions are associated with the biocidal activity of these metals. These methods include providing silver, gold or copper nanoparticles on the seed surface, which contributes to the reduction of the negative effects of bacterial activity after sowing seeds into the soil, and thus increases the number of germinated, vigorous seeds, which subsequently develop young, healthy seedlings. As a consequence, it leads to an increased agricultural crop. These are the methods of a so-called: normal spray or, as in the latter described case, a complicated and expensive electrolytic method. Furthermore, known methods and products are related to nanoparticles in ionic form. Moreover, between the electrodes, not only metal ions but also an electromagnetic field can be active. Therefore, it is not entirely clear what the stimulating effect of plant growth is related to.

Publication J. Nawaz et al.: "Seed Priming A Technique" International Journal of Agriculture and Crop Sciences, vol. 6, no. 20, 1 Jun. 2013, p. 1373-1381 discloses a technique of seed priming in which increasing a level of moisture surrounding a seed initiates the physiochemical processes of germination. Use of copper and silver nanoparticles to stimulate grain and vegetable crops is disclosed by S. N. Maslobrod et al.: "Stimulation of Seed Viability by Means of Dispersed Solution of Copper and Silver Nanoparticles", 1 Jan. 2013, p. 21-22. Publication Quoc Buu Ngo et al.: "Effects of nanocrystalline powders (Fe, Co and Cu) on the germination, growth, crop yield and product quality of soybean (Vietnamese species DT-51)" (Advances in Natural Sciences: Nanoscience and Nanotechnology, vol. 5, no. 1, 28 Feb. 2014, p. 15016-1) discloses a method of pre-sowing treatment of dicotyledonous soybean seeds in which the seeds are treated with a solution of zero valence nanoparticulate cooper, iron or cobalt.

However, the application of nonionic metal nanoparticles in the process of stimulating plant seeds so as to accelerate and equalise germination is not known.

SUMMARY

The method for seed stimulation according to the invention is characterised in that the seeds of dicotyledonous plants are primed in an aqueous solution containing nonionic nanoparticles of a metal selected from: silver (Ag), gold (Au), copper (Cu) and platinum (Pt) at a concentration from 0.05 ppm to 50 ppm to obtain 40-60% by weight of water content, and then the seeds are dried at room temperature to obtain 10-40% by weight of water content. In the method according to the invention, a nonionic nanocolloidal metal solution, preferably obtained using a physical method, preferably using Bredig's method, is applied. The applied nanocolloidal solution is a solution in deionised water.

DETAILED DESCRIPTION

The seeds should be subjected to a stage of preliminary rinsing in water in order to remove germination inhibitors and potential pathogens present on the surface of the seeds. In case of application of the preliminary rinsing stage, the seeds are subsequently dried to obtain a water content from 10 to 40% by weight.

As seeds of dicotyledonous plants, the seeds of the following plants are used: winter oilseed crops resistant to cold, such as canola; sown in early spring and sensitive to cold to a limited extent, such as: sugar beet, peppers; long germinating seeds of vegetables, such as: carrot, celery.

Preferably, the stage of priming in a solution containing metal nanoparticles is conducted within a period of 1-24 hours, adapted to the plant species.

The invention also comprises the use of a colloidal solution of nonionic nanoparticles of a metal selected from: silver, gold, copper and platinum to stimulate the seeds.

In the method according to the invention, nanocolloidal metal solutions, in which metal nanoparticles do not have an ionic form, are used. However, these are solutions with a highly dispersed metallic phase, obtained with the use of a physical method, e.g. Bredig's method based on spraying pure metals in a voltaic arc or with the use of Bredig's method, wherein Bredig's method was indicated as an example, because in the method according to the invention, nonionic nanoparticles produced with the use of any physical method can be used. As a result, metal nanoparticles free from any impurities, of a purity exceeding 99.9%, are obtained. In contrast, metal particles in ionic form are obtained using chemical methods, which usually leave impurities on the surface of the particles. A physical method can be used to produce nanoparticles in the form of very small clusters suspended in pure, demineralised water. The percentage of metal particles in such solutions in higher than in the case of ionic solutions, and their active surface is also larger.

As a result of priming, nonionic nanoparticles of the above-mentioned metals penetrate into the seeds and remain there, in contrast to the application of ions of the same metals on the surface of grains, as in the above-described methods. Nanoparticles, unlike ions, do not have an electric charge. Thanks to this, they can easier cross a polarised cell membrane, do not require special protein ion channels and can engage in plant metabolism, e.g. they can constitute a catalyst for enzymatic reactions. In contrast, water is a carrier and facilitates the movement of nanoparticles in the tissues of the plant.

Seeds prepared in this manner germinate considerably faster than seeds not subjected to prior priming in a water solution of colloidal nanoparticles, and additionally, germination is very even, which means that all seeds germinate at the same time, which is extremely important in the cultivation of e.g. sugar beet, canola, etc.

It is known that the seeds of e.g. sugar beet, which after 96 h of germination under optimum conditions have a germination capacity at a level of not less than 95%, are considered to be of high quality. In the case of application of the method according to the invention, this reproducible effect is achieved, and it is also possible to achieve this effect as early as after 72 h.

The use of metal nanoparticles of known biocidal activity further increases the resistance of seeds to the harmful effect of pathogens; however, the effect of stimulation is also present in the case of metals with no attributed biocidal activity, such as gold and platinum. This indicates that the stimulation effect is achieved due to other characteristics of metal nanoparticles than only biocidal activity. This hypothesis was confirmed by the results of the conducted studies. The seeds were stimulated under non-sterile laboratory conditions, sown after stimulation into plastic containers lined with filter paper soaked with deionised water and incubated in an environmental chamber. Under such conditions, the seeds were not exposed to adverse effects of soil contamination under field conditions but to groups of pathogens potentially present on the surface of the seeds, containers, filter paper or in the air.

It should be emphasised that the effect declared in the method according to the invention did not occur when the seeds were stimulated with an Ag solution in ionic form, and the effects obtained in comparison with seeds not stimulated with metal nanoparticles were even worse.

EXAMPLES

The invention has been described based on the examples.

Example 1

Effect of Colloidal Solutions of Nonionic Nanoparticles of Ag, Au, Cu and Pt on the Germination of Sugar Beet Seeds.

Colloidal solutions of nanoparticles: silver (Ag) at an initial concentration of 100 ppm, copper (Cu) at an initial concentration of 100 ppm, gold (Au) at an initial concentration of 50 ppm and platinum (Pt) at an initial concentration of 20 ppm, were obtained using Bredig's method, in a device known from the description of Polish utility model No. RWU.066178.

Aqueous solutions of copper, silver, gold and platinum nanoparticles at concentrations of 0.05 ppm, 0.1 ppm, 0.5 ppm, 1 ppm, 5 ppm, 10 ppm, 20 ppm and 50 ppm were prepared—for this purpose, the initial solutions of the above-mentioned nanoparticles were diluted with deionised water.

The study material comprised dry fruits of sugar beet called seeds in the description of the invention (in the case of sugar beet, the seed material comprises botanical fruits; however, in scientific papers, they are called seeds, while a botanical seed is present in the ligneous pericarp and is covered with a lid), of high vigour (Janosik variety provided by the Sugar Beet Cultivation Plant in Kutno), not stimulated, rinsed with water for 2 h, and subsequently dried to a moisture of 20%. The seeds used in this experiment were not treated with fungicides or other plant protection products. Seeds prepared in this way (approximately 300 units) were primed (in light, at room temperature) in 200 ml of respective solutions of nanoparticles for 4 h, under continuous stirring. Seeds primed in deionised water, not containing nanoparticles, were used as control.

After priming, the seeds were allowed to dry for 48 h, in light, at room temperature, on a solid surface having no sorption properties to avoid the effect of chromatography, which could take place when using e.g. filter paper.

Germination tests were conducted in a Fitotron chamber under optimum conditions for sugar beet (15° C., dark) in technical triplicate (3×100 seeds), wherein the % of germinated seeds was controlled every day for 4 consecutive days. The seeds germinated in plastic containers, lined with filter paper, of a field water capacity of 60% (the optimum for sugar beet). It is agreed that a germinated seed is a seed in which the lid of the pericarp was broken by an elongating radicule (visible without microscope/binoculars).

The results were averaged for 3 repetitions and are presented in Table 1 in the form of the % of germinated seeds.

All nanoparticles in each of the applied concentrations caused an increase in the rate and capacity of germination, both after 72 and 96 h of germination, as compared to the control (seeds primed in deionised water).

In the case of using gold nanoparticles at a concentration of 10 ppm and 20 ppm, the effect of stimulation of germination was observed as early as after 48 h of imbibition. The use of nanoparticles of silver and copper also produced a positive effect, as compared to the control, 72 h after conducting the test. The effect of stimulation of germination by all applied solutions of nanoparticles was observed even after 96 h of imbibition.

Example 2

Comparative Test of Nonionic Ag Nanoparticles with Ionic Ag Nanoparticles for the Germination of Sugar Beet Seeds.

Similarly as in Example 1, a colloidal solution of nonionic silver particles at an initial concentration of 100 ppm and ionic Ag particles at an initial concentration of 200 ppm were suitably diluted with deionised water. Colloidal solutions of nonionic silver nanoparticles were obtained using Bredig's method, in a device known from the description of Polish utility model No. RWU.066178, while the source of ionic Ag particles was a commercially available solution of the composition.

The study material comprised dry fruits of sugar beet of the same type and was prepared in a similar manner as described in Example 1. The results are presented in Table 2.

It should be emphasised that in the case of application of an Ag solution in ionic form, no stimulation effect was observed after 32 h, and on the contrary, it was observed that the application of Ag solutions in ionic form produced worse results in comparison to seeds stimulated with a solution of Ag nanoparticles in nonionic form, and was worse even in comparison to the controlled, non-stimulated group.

Example 3

Effect of Colloidal Nonionic Solutions of Ag Nanoparticles on the Germination of Pepper Seeds.

Colloidal solutions of silver (Ag) nanoparticles at an initial concentration of 100 ppm, obtained using Bredig's method, were diluted with deionised water to concentrations of 1 ppm and 20 ppm.

The study material comprised dry seeds of peppers of varieties: Variety a, Variety b and Variety c. The seeds were primed in a solution of Ag nanoparticles and deionised water (control), respectively for 1 h, in light, at room temperature, on a solid surface having no sorption properties to avoid the effect of chromatography, which could take place when using e.g. filter paper (in the same manner as described in Example 1 for sugar beet seeds). Subsequently, the seeds were subjected to slow drying. Seeds prepared in this way were germinated at 20° C., in a Fitotron chamber, in technical triplicate (3×100 seeds), wherein the % of germinated seeds was controlled every day for 7 consecutive days. The seeds germinated in plastic containers, lined with filter paper, of a field water capacity of 60%.

The use of solutions of Ag nanoparticles at a concentration of 1 and 20 ppm significantly improved the germination of most tested pepper varieties. The results are presented in Table 3.

TABLE 1

Effect of colloidal solutions of nonionic Ag, Au, Cu and Pt nanoparticles on the germination of sugar beet seeds

| Type of solution | Concentration (ppm) | % of germinated seeds after a defined period of imbibition | | | |
|---|---|---|---|---|---|
| | | 24 h | 48 h | 72 h | 96 h |
| Control ($H_2O$) | | 0 | 0 | 57 | 85 |
| nano-Ag | 0.05 | 0 | 2 | 78 | 94 |
| | 0.1 | 0 | 0 | 57 | 92 |
| | 0.5 | 0 | 0 | 55 | 95 |
| | 1 | 0 | 0 | 74 | 100 |
| | 5 | 0 | 0 | 75 | 98 |
| | 10 | 0 | 0 | 69 | 94 |
| | 20 | 0 | 0 | 70 | 95 |
| | 50 | 0 | 0 | 51 | 92 |
| nano-Cu | 0.05 | 0 | 1 | 77 | 95 |
| | 0.1 | 0 | 0 | 66 | 96 |
| | 0.5 | 0 | 0 | 50 | 94 |
| | 1 | 0 | 0 | 70 | 91 |
| | 5 | 0 | 0 | 80 | 94 |
| | 10 | 0 | 0 | 79 | 98 |
| | 20 | 0 | 0 | 86 | 98 |
| | 50 | 0 | 0 | 49 | 95 |
| nano-Au | 0.05 | 0 | 0 | 60 | 97 |
| | 0.1 | 0 | 0 | 50 | 94 |
| | 0.5 | 0 | 0 | 84 | 98 |
| | 1 | 0 | 1 | 90 | 99 |
| | 5 | 0 | 1 | 89 | 97 |
| | 10 | 0 | 7 | 96 | 98 |

TABLE 1-continued

Effect of colloidal solutions of nonionic Ag, Au, Cu and Pt nanoparticles on the germination of sugar beet seeds

| Type of solution | Concentration (ppm) | % of germinated seeds after a defined period of imbibition | | | |
|---|---|---|---|---|---|
| | | 24 h | 48 h | 72 h | 96 h |
| | 20 | 0 | 13 | 95 | 97 |
| | 50 | 0 | 0 | 57 | 93 |
| nano-Pt | 0.05 | 0 | 2 | 75 | 95 |
| | 0.1 | 0 | 1 | 78 | 97 |
| | 0.5 | 0 | 0 | 53 | 91 |
| | 1 | 0 | 1 | 88 | 100 |
| | 5 | 0 | 2 | 86 | 96 |
| | 10 | 0 | 3 | 92 | 98 |
| | 20 | 0 | 2 | 93 | 97 |

TABLE 2

Comparative test of nonionic Ag nanoparticles with ionic Ag nanoparticles for the germination of sugar beet seeds.

| Type of solution | Concentration ppm | % of germinated seeds after a defined period of imbibition | | | |
|---|---|---|---|---|---|
| | | 24 h | 48 h | 72 h | 96 h |
| Control ($H_2O$) | | 0 | 0 | 57 | 85 |
| nano-Ag | 1 | 0 | 0 | 74 | 100 |
| | 20 | 0 | 0 | 70 | 95 |
| Ionic Ag | 1 | 0 | 0 | 35 | 59 |
| | 20 | 0 | 0 | 52 | 96 |

TABLE 3

Effect of colloidal nonionic solutions of Ag nanoparticles on the germination of pepper seeds.

| Type of treatment | % of germinated seeds after 7 days of imbibition | | |
|---|---|---|---|
| | Variety a | Variety b | Variety c |
| Control ($H_2O$) | 75 | 75 | 75 |
| nano-Ag (1 ppm) | 85 | 80 | 80 |
| nano-Ag (20 ppm) | 85 | 85 | 85 |

What is claimed is:

1. A method for the stimulation of seeds of sugar beet comprising priming sugar beet seeds in a solution containing metal nanoparticles and subsequently drying said seeds, wherein the seeds are primed in a nanocolloidal metal solution containing nonionic nanoparticles selected from the group consisting of silver (Ag), gold (Au) and platinum (Pt), wherein the nanoparticles are produced using a physical method, wherein said nanoparticles are at a concentration of 0.05 ppm to 50 ppm, wherein after priming the seeds have a water content of 40-60% by weight, wherein the primed seeds are dried at room temperature to obtain a water content of 10-40% by weight.

2. The method according to claim 1, wherein a nonionic nanocolloidal metal solution in deionised water is applied.

3. The method according to claim 2, wherein seeds are preliminarily rinsed with water and the seeds are dried until a water content of 10-40% by weight is obtained.

* * * * *